United States Patent
Booton et al.

(10) Patent No.: US 7,609,827 B1
(45) Date of Patent: Oct. 27, 2009

(54) COMPUTER TELEPHONY INTEGRATION

(75) Inventors: Laurence J Booton, Ipswich (GB); Charles R Carrington, Ipswich (GB)

(73) Assignee: British Telecommunications plc, London (GB)

( * ) Notice: Subject to any disclaimer, the term of this patent is extended or adjusted under 35 U.S.C. 154(b) by 0 days.

(21) Appl. No.: 09/936,220

(22) PCT Filed: Mar. 16, 2000

(86) PCT No.: PCT/GB00/00984

§ 371 (c)(1),
(2), (4) Date: Sep. 10, 2001

(87) PCT Pub. No.: WO00/59190

PCT Pub. Date: Oct. 5, 2000

(30) Foreign Application Priority Data

Mar. 31, 1999 (GB) ................................ 9907434.6
Jul. 6, 1999 (EP) ................................ 99305333

(51) Int. Cl.
*H04M 1/56* (2006.01)
*H04M 3/42* (2006.01)

(52) U.S. Cl. .............................. 379/142.06; 379/207.14; 379/207.15

(58) Field of Classification Search ............. 379/142.06, 379/45, 211.02, 266.09, 207.14–207.15
See application file for complete search history.

(56) References Cited

U.S. PATENT DOCUMENTS 4,086,438 A * 4/1978 Kahn et al. ................. 379/158
5,309,504 A * 5/1994 Morganstein ............... 379/67.1
5,889,845 A * 3/1999 Staples et al. ........... 379/211.02
6,252,953 B1 * 6/2001 Gruchala et al. ....... 379/207.01

FOREIGN PATENT DOCUMENTS

| DE | 198 13 463 A1 | 11/1998 |
|---|---|---|
| WO | WO 96/27266 | 9/1996 |
| WO | WO 98/48557 | 10/1998 |

* cited by examiner

*Primary Examiner*—Rasha S Al Aubaidi
(74) *Attorney, Agent, or Firm*—Nixon & Vanderhye PC

(57) ABSTRACT

A CTI system includes a translation table of user names against consistent (i.e. simulated) calling line identity. When a user originates a call, the CTI server knows the name of the user currently associated with, i.e. logged on at, the originating work desk, and refers to the consistent CLI translation table to obtain the consistent CLI for that user, and to instruct the switch to make the call using that consistent CLI in the setup signalling message. In some CTI systems, the consistent CLI translation table is in the form of a user-associated dummy terminal translation table, and the CTI server instructs the PBX to make a call from the respective user-associated dummy terminal. In this case, the PBX stores the consistent CLI corresponding to that dummy terminal. Calling users can originate calls from any of the systems work desks, or even from remote telephones, and the system will always deliver a setup signalling message containing the respective consistent CLI allocated to the calling user, thus enabling a return call to be properly delivered or recognized as such.

13 Claims, 8 Drawing Sheets

CLI-NAME TRANSLATION TABLE

54B

| CLIENT ID | NAME |
|---|---|
| IP ADDRESS #001 | ERIC |
|  |  |
| IP ADDRESS #100 | STEVE |
| IP ADDRESS #101 | BOB |
| IP ADDRESS #102 | DOUG |
|  |  |
| IP ADDRESS #200 | CHARLIE |

CLIENT/IDENTITY-TO-NAME TRANSLATON TABLE

Fig. 6

NAME-TO-SIMULATED CLI TRANSLATION TABLE

COMPUTER TELEPHONY INTEGRATION

BACKGROUND

1. Technical Field

This invention relates to communications switching systems, and particularly to the use of a computer for controlling the operation of a telephony system, such use is known in the art as computer telephony integration (CTI), and the systems employing such control are known as CTI systems.

2. Related Art

As a general background, the reader will find examples of such CTI systems disclosed in the articles "Introduction to Computer Telephony Integration", by A. Catchpole, G. Crook, and D. Chesterman, British Telecommunications Engineering, Vol. 14, July 1995; "Computer Telephony Integration—The Meridian Norstar", by A. Catchpole, British Telecommunications Engineering, Vol. 14, October 1995; "Computer Telephony Integration—The Meridian 1 PBX", by P. Johnson, A. Catchpole, and L. Booton, British Telecommunications Engineering, Vol. 15, July 1996; "Callscape—Computer Telephony Integration for the Small Business", by G. Hillson, G. Hardcastle, and M. Allington, British Telecommunications Engineering, Vol. 15, January 1997, and "Call Centres—Doing Business by Telephone" by M. Bonner, British Telecommunications Engineering, Vol. 13, July 1994.

Furthermore, a method is known of operating a CTI system comprising a CTI-enabled PBX, an associated CTI controller, and a plurality of user workstations, each workstation comprising a computer connected to the CTI controller and a telephone connected to the PBX In this method, the CTI controller stores respective user-associated profiles, each including a user-associated workgroup containing names of users of the system, in whose telephony status the user associated with that workgroup is interested, and the PBX on receipt of an incoming call retrieves from the signalling data a dialed number (known as the Dialed Number Identification Service number (DNIS)) and the calling line identity or identification (CLI), and passes these to the CTI controller. The CTI controller translates the DNIS to a username for the called user and accesses the workgroups to find out which contain that username. The CTI controller then sends a message containing that username to each computer at which a user, whose workgroup contains that username, is currently logged on to the CTI controller. It will be appreciated that in the art, the terms log on, logon, log in and login are synonymous and interchangeable, as are the terms log off, logoff, log out and logout.

While a user is currently logged on to the CTI controller, his computer displays a respective set of icons representing the members of that user's workgroup, the icons being in the form of respective facial images, each icon including a text display, e.g. "Free", to indicate the current telephony status of the corresponding user, and upon receipt of this message, the computers change the text display of the icon corresponding to the received user name to "Ringing". A user can answer an incoming call for a member of his workgroup by sending an answer message from his computer to the CTI controller, and the CTI controller responds by commanding the PBX to connect the incoming call to that user's telephone. This method is referred to as Distributed Office Telephony (DOT), and a specific embodiment of such a known system is disclosed in International Patent Publication Number WO 98/488557.

BRIEF SUMMARY

In accordance with a first aspect of the present invention there is provided a method of operating a switching system to make a call, the method comprising the steps of:
receiving from a calling party a request for the making of a call;
obtaining from the calling party a called party identity; and
generating a setup signalling message for establishing a call to the called party, the setup signalling message having a calling line identity field, the method being characterised by the steps of:
obtaining an actual identity for the calling party; and
translating the obtained actual calling party identity to obtain a corresponding simulated calling line identity, and the method being further characterised in that the generating step writes the obtained corresponding simulated calling line identity into the calling line identity field of that setup signalling message.

Whereas previously a setup signalling message for establishing a call to the called party would be generated by a PBX with the calling line identity field containing the CLI of the extension actually used by the calling party, or containing a number representative of that PBX, for example the base range number of the trunk connecting the PBX to the public network, an advantage of the present invention is that called parties are always in possession of a calling line identity, referred to herein as a consistent CLI, which they can use to make a return call to the calling party, or just to inform the system of the identity of the original calling party, regardless of the location from which that calling party has made a call. This enhances the operation of users of systems which permit the users to log on at any of a plurality of work desks of the system, or even permit the users to originate calls, via a public switched telephone network, from their own, or other people's, private telephones.

Preferably, the step of obtaining an actual calling party identity comprises the substeps of detecting the actual calling line identity of a line which has changed to off hook status, and translating the detected calling line identity to obtain a corresponding actual calling party identity currently recorded as being associated with that line.

Alternatively, when the switching system comprises a CTI-enabled switch together with a CTI controller, and a plurality of user-associated computers connected to the CTI controller, the step of obtaining an actual calling party identity may comprise the substeps of detecting the identity of a computer from which a make call request has been sent to the CTI controller, and translating the detected computer identity to obtain a corresponding actual calling party identity for a user currently recorded as being logged on at that computer to the CTI controller.

Alternatively, the step of obtaining an actual calling party identity may comprise the substeps of retrieving from signalling information of an incoming call to the switching system a calling line identity, and translating the retrieved calling line identity to obtain a corresponding actual calling party identity.

Preferably, there is included the step of joining the incoming call to the call to the called party.

Alternatively, there may be included the steps of clearing down that incoming call, making a call to the calling party based on the calling line identity of that incoming call, and joining the call to the calling party to the call to the called party.

in accordance with a second aspect of the present invention there is provided a switching system comprising:

means for receiving from a calling party a request for the making of a call;

means for obtaining from the calling party a called party identity; and means for generating a setup signalling message for establishing a call to the called party, the setup signalling message having a calling line identity field, the switching system being characterised by:

means for obtaining an actual identity for the calling party; and means for translating the obtained actual calling party identity to obtain a corresponding simulated calling line identity, and the switching system being further characterised in that the generating means is arranged to write the obtained corresponding simulated calling line identity into the calling line identity field of that setup signalling message.

Preferably, the means for obtaining an actual calling party identity is arranged to detect the actual calling line identity of a line which has changed to off hook status, and to translate the detected calling line identity to obtain a corresponding actual calling party identity currently recorded as being associated with that line.

Alternatively, when the system comprises a CTI-enabled switch together with a CTI controller, and a plurality of user-associated computers connected to the CTI controller, and the means for obtaining an actual calling party identity may be arranged to detect the identity of a computer from which a make call request has been sent to the CTI controller, and to translate the detected computer identity to obtain a corresponding actual calling party identity for a user currently recorded as being logged on at that computer to the CTI controller.

Preferably, the means for obtaining an actual calling party identity may be arranged to retrieve from signalling information of an incoming call to the switching system a calling line identity, and to translate the retrieved calling line identity to obtain a corresponding actual calling party identity.

BRIEF DESCRIPTION OF THE DRAWINGS

A specific embodiment of a switching system, and its method of operation, will now be described by way of example with reference to the drawings, in which:—

FIG. 6 shows the structure of part of a client identity-to-name translation table used by the CTI server.

DETAILED DESCRIPTION OF EXEMPLARY EMBODIMENTS

In this description the following acronyms are used:—

CLI—Calling Line Indication, also known as Calling Line Identity,

CSTA—Computer Supported Telecommunications Applications,

CTI—Computer Telephony Integration,

DNIS—Dialed Number Identification Service number,

DOT—Distributed Office Telephony,

ISDN—Integrated Services Digital Network,

IP—Internet Protocol,

LAN—Local Area Network,

PBX—Private Branch Exchange,

RAM—Random Access Memory,

ROM—Read Only Memory.

Figure 1:
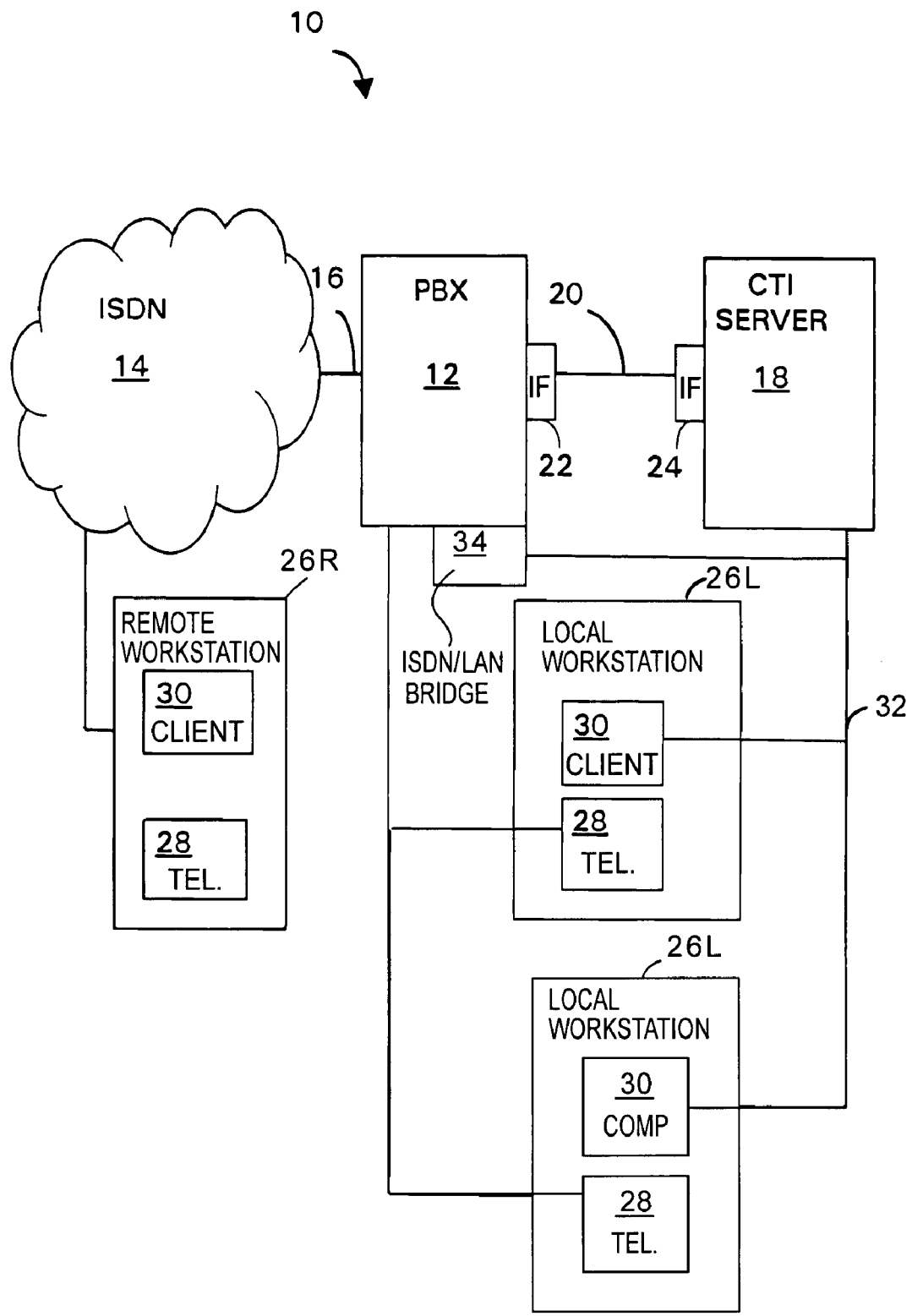
FIG. 1 is a block diagram of a switching system of the present invention.

In FIG. 1 there is shown a switching system, also referred to as a CTI system, 10, comprising a CTI-enabled PBX 12, constituting a switch of the present invention, connected to an ISDN 14 via an ISDN primary rate link 16, and a CTI server 18 connected to the PBX 12 via a data link 20. The PBX 12 has a CTI interface 22 which operates in accordance with the abovementioned CTI protocol, CSTA, and the CTI server 18 has a CTI interface 24 which operates in accordance with that protocol. There are a number of proprietary CTI protocols, e.g. Meridian Link from Northern Telecom, and several "open", or proposed standard, CTI protocols, including CSTA, but the performance of the present invention is not dependent upon the use of any particular CTI protocol.

The CTI system 10 also comprises a plurality of work desks, also known as workstations, 26R, situated remotely from the PBX 12, and a plurality of work desks 26L, situated locally to the PBX 12, each work desk having a respective telephone terminal 28R, 28L, referred to hereinafter as a telephone, and a respective computer terminal 30R, 30L, referred to hereinafter as a CTI client, or just client. For convenience, only one remote work desk 26R and only two local work desks 26L are shown.

The CTI server 18, which constitutes a CTI controller of the present invention, and the local CTI clients 30L are directly connected to a LAN 32, and each remote CTI client 30R is indirectly connected to the LAN 32 via the ISDN 14 when a user at the respective remote work desk 26R makes a call to a predetermined destination number for access to the LAN 32. The PBX 12 receives that call and connects it to a corresponding port which is connected to the LAN 32 via an ISDN/LAN bridge 34.

Figure 2:
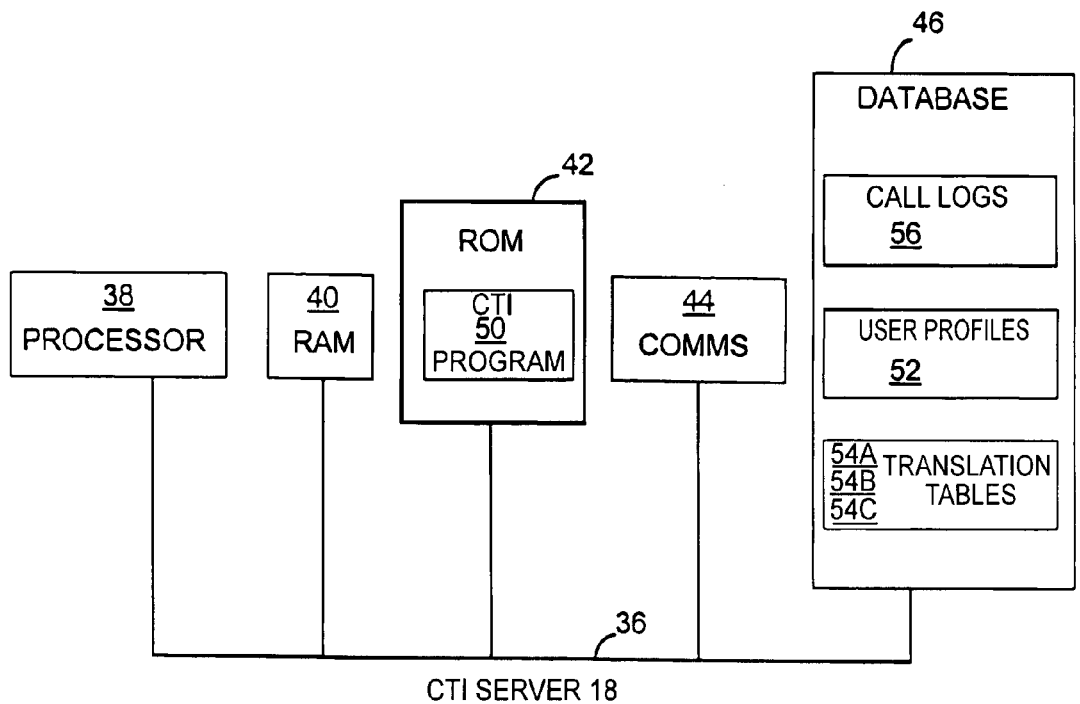
FIG. 2 shows the component parts of a CTI server of the switching system of FIG. 1.

In FIG. 2, the CTI server 18 comprises an internal bus 36 to which is connected a processor 38, a RAM 40, a ROM 42, a data communications stack 44, and a database 46. The ROM 42 contains a conventional operating system program for controlling the processor 38, and a CTI program 50 for performing CTI functions including managing user profiles 52. The database 46 stores call logs 56, and the user profiles 52.

The skilled person in the art will know of various CTI programs that are used in CTI systems, for example, automatic call distribution programs, user profile management programs, distributed office telephony management programs. The present invention is not limited to any one type of CTI program, and a detailed description of the CTI program 50 will not be given, other than the component parts relevant to the present invention.

In accordance with the present invention, the CTI program 50 manages a calling line identity-to-name translation table 54A, a client identity-to-name translation table 54B, and a name-to-simulated calling line identity translation table 54C, all stored in the database 46. As will be described in detail later, the translation table 54A relates to the telephone of a remote user, and this is managed dynamically to enable a remote user to be mobile in the sense of being able to operate from any telephone and not from just his residential telephone, and the translation table 54C relates to the "consistent CLI" which is permanently associated with that user and will be included in the CLI field of setup messages of outgoing calls requested by that user to enable, for example, the use by called parties of the "1471" service operated by British Telecommunications plc (BT) to obtain a CLI and make a return call to that CLI, this being delivered to the current location of the calling user by the CTI system by inverse use of the translation tables. A simulated CLI of the present invention has the same digit format as a real CLI, and is inserted into the CLI field of a setup signalling message. It is treated by the receiving apparatus as a normal CLI, i.e. in the sense that it uniquely identifies a telephone from which the original call had been made, and to which a return call can be made. Calls made to the simulated CLI are delivered to the party associated with that simulated CLI by use of translation tables which hold information as to the identity of that party and his current recorded location. In this description, the server 18 constitutes a means for responding to a request for the making of a call by obtaining an actual calling party identity; also a means for translating the obtained actual calling party identity to obtain a corresponding simulated calling line identity, and also a means for obtaining a called party identity. The PBX 12 and the CTI server 18 together constitute a means for generating a setup signalling message to be sent for establishing a call to the called party, the setup signalling message having a calling line identity field containing the obtained corresponding simulated calling line identity. Where the user goes off hook at his telephone 28L, the PBX 12 and the CTI server 18 together constitute a said responding means arranged to detect the actual calling line identity of a line which has changed to off hook status, and to translate the detected calling line identity to obtain a corresponding actual calling party identity currently recorded as being associated with that line; and also a said responding means arranged to retrieve from signalling information of an incoming call to the switching system a calling line identity, and to translate the retrieved calling line identity to obtain a corresponding actual calling party identity.

Figure 4:
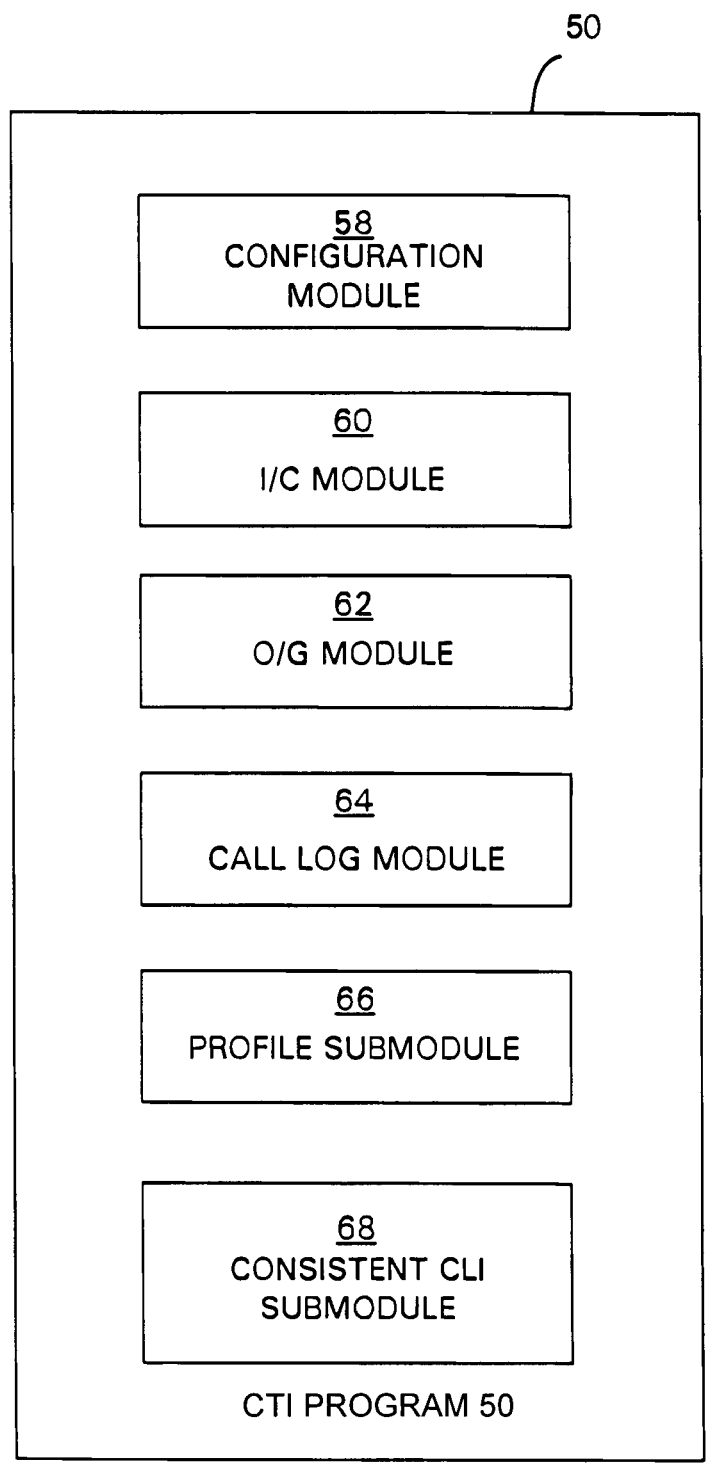
FIG. 4 shows the modules of a CTI program which controls the operation of the CTI server.
Figure 5:
FIG. 5 shows the structure of part of a calling line identity-to-name translation table used by the CTI server.
Figure 7:
FIG. 7 shows the structure of part of a name-to-simulated calling line identity translation table used by the CTI server.

As shown in FIG. 4, the CTI program 50 comprises a number of main modules, namely a Configuration module 58, an Incoming Call module 60, an Outgoing Call module 62, and a Call Log module 64. As is known in the art, these main modules comprise submodules for performing various parts of their main function, for example, the Configuration module 58 comprises a Profile submodule 66 for managing the user profiles 52. As mentioned above, the present invention is not restricted to any one form of CTI program 50, which, for example, can be for Automatic Call Distribution or for Distributed Office Telephony, and the skilled person in the art will know how to provide such modules and submodules as is required by his particular situation. For the purposes of the present invention it will be sufficient to describe in detail the function and operation of a Consistent CLI submodule 68 forming part of the Outgoing Call module 62.

Figure 3:
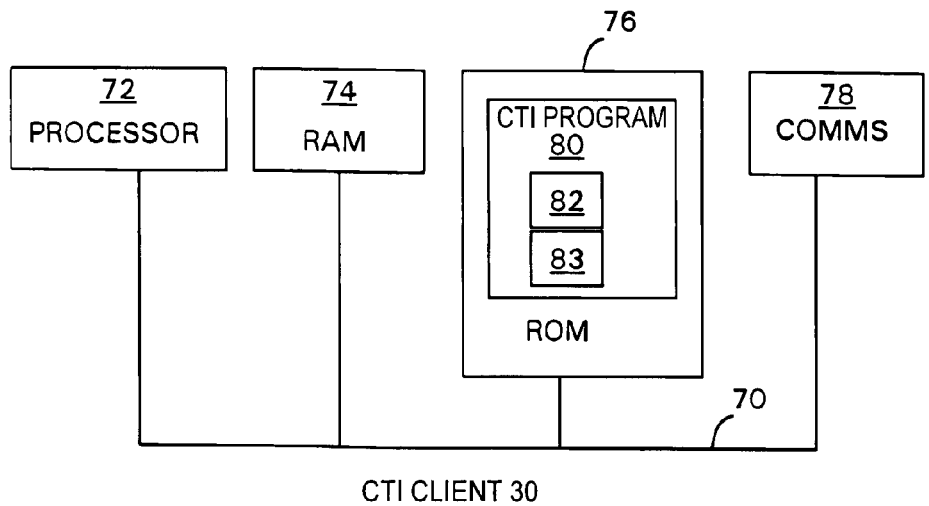
FIG. 3 shows the component parts of a CTI client of the switching system of FIG. 1.

As shown in FIG. 3, the CTI client 30L comprises an internal bus 70 to which is connected a processor 72, a RAM 74, a ROM 76, and a data communications stack 78. The ROM 76 contains an operating system program for controlling the processor 72, and also contains a CTI program 80 for the operation of the CTI client 30L.

The PBX 12 is arranged for Direct Dialing Inward (DDI) and has a numbering range of nnnnn 800700 to nnnnn 800899, as is known in the art. Each user of the system is permanently allocated one of these numbers by the system administrator, and that allocation is recorded in the name-to-simulated calling line identity translation table 54C.

In a first scenario, suppose that a user having the name Bob, constituting an actual calling party identity of the present invention, has been allocated the number nnnnn 800800, and is currently logged on to the CTI controller 18 at one of the work desks 26L. Each of the clients 30L has a unique client identity constituted by its IP address on the LAN 32. Suppose that the CTI program 50 has a facility for users to make calls via their clients. The user Bob clicks on a Dial button on the screen of his client 30L, and a Dialer drop down box appears on the screen. This box contains a screen representation of a telephone keypad, and also a button for accessing the user's Personal Directory. The user Bob now enters called number digits for a called party, either via his client's keyboard, or via the screen keypad, or via a selection from his personal directory, and these called number digits appear in a window in the drop down box.

Figure 8:
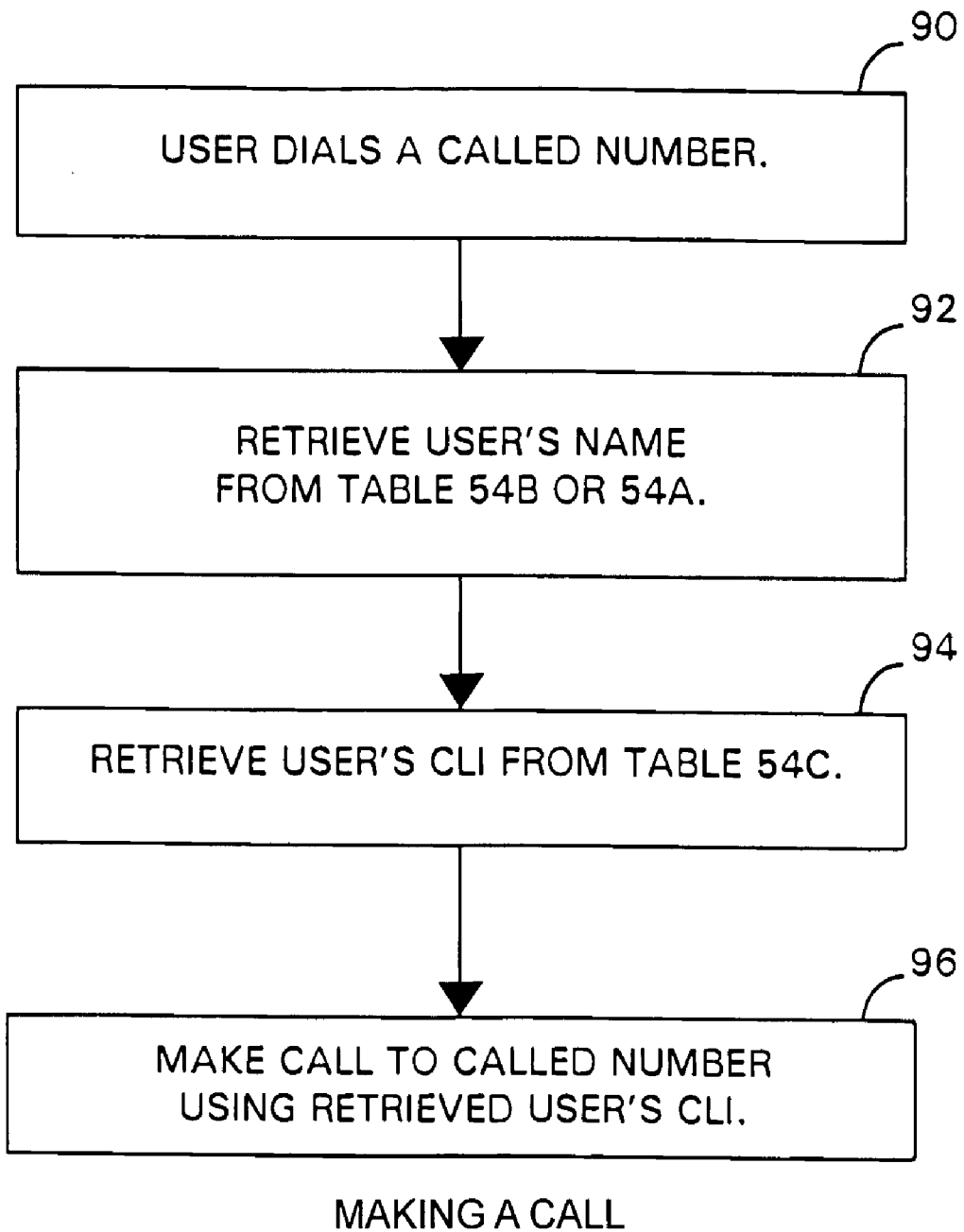
FIG. 8 is a flow chart showing steps of making a call in accordance with a method of the present invention.

When the user Bob is ready to make the call, he clicks on a Call button in the drop down box, and, in response, his client 30L sends a Call Request message to the CTI server 18 (step 90, FIG. 8). The Consistent CLI submodule 68 obtains from that message the IP address of that client 30L, and refers to the client identity-to-name translation table 54B to obtain the name, i.e. Bob, of the user who is currently recorded as being logged on at that client (step 92, FIG. 8). This step is necessary if the user is permitted by the system administrator to log on at any of the work desks 26, and it will be appreciated that if another user, Steve, had logged on at that client, then the CTI server 18 will have entered the name Steve against that client's IP address in the client identity-to-name translation table 54B.

Using the name just obtained, Bob, the Consistent CLI submodule 68 now refers to the name-to-simulated calling line identity translation table 54C to obtain the corresponding calling line identity, in this case, nnnnn 800800 (step 94, FIG. 8). The Consistent CLI submodule 68 now makes this obtained calling line identity available to the Outgoing Call module 62, which commands the PBX 12 to insert it into the calling line identity field of a setup signalling message, and to send this signalling message to the ISDN 14 via the ISDN primary rate link 16 (step 96, FIG. 8). Thus, the called party having that called number will always receive the CLI nnnnn 800800 regardless of which of the work desks 26 the user, Bob, is currently using.

The PBX 12 in the above embodiment has a highly sophisticated design, and can command the telephone 28L at the work desk where the user, Bob, is logged on to go into "hands-free" dialing mode, record the internal port as off-hook, make the outgoing call from an external port connected to the primary rate link 16, and connect the internal and external ports.

In a variant, the PBX 12 is less sophisticated and has actual telephones 28L connected to internal ports, say, 000 to 199, and respective dummy terminals connected to internal ports, say, 200 to 399, which correspond to the allocated CLIs, e.g. the dummy terminal connected to internal port 234 corresponds to the CLI nnnnn 800800. In this case, when the user Bob, who is currently logged on at a work desk 26L whose telephone 28L is connected to internal port 101, performs the Dial procedure, the translation stages are: client IP address to name (Bob) via table 54B, and name (Bob) to dummy terminal (234) via table 54C, which in this case is actually a dummy terminal-to-name translation table, but because of the one-to-one correspondence with CLI (800800) within the control software of the PBX 12, is in conjunction with the PBX 12, effectively a name to CLI translation. In other words, the control software of the PBX 12 contains a table relating the dummy terminal (234) to its CLI (nnnnn 800800). The PBX 12 makes a first call from the internal port 234 to the called number, and a second call to the telephone 28L at the internal port 101, and joins the two calls.

In another scenario, suppose that a user, who has the name Charlie and who has been allocated the CLI nnnnn 800801, logs on at a remote work desk 26R by making an ISDN call to the PBX 12 using one of the B channels of a 2B+D Basic Rate ISDN link from his site to the ISDN 14. His name, Charlie, is entered by the CTI server 18, at log on, in the client identity-to-name translation table 54B against the IP address of his client 30R. When Charlie performs the above Dial procedure using his client, the Consistent CLI submodule 68 obtains from the Call Request message the IP address of that client 30R, and refers to the client identity-to-name translation table 54B to obtain the name, Charlie, of the user who is currently recorded as being logged on at that client.

Using the name just obtained, Charlie, the Consistent CLI submodule 68 now refers to the name-to-simulated calling line identity translation table 54C to obtain the corresponding calling line identity, in this case, nnnnn 800801. The Consistent CLI submodule 68 now makes this obtained calling line identity available to the Outgoing Call module 62, which inserts it into the calling line identity field of a setup signalling message, and commands the PBX 12 to make a first outgoing call by sending this signalling message to the ISDN 14 via the ISDN primary rate link 16. The CTI server 18 also refers to the database 46 to obtain the network number of the telephone 28R associated with the client 30R at which Charlie is logged on, commands the PBX 12 to make a second outgoing call to the obtained network number, and joins these two calls.

In the above variant, the PBX 12 is commanded to make the first call to the called number from one of the dummy terminals, and to make the second call to Charlie's telephone from another of the dummy terminals, and to join the two calls.

In a modification of this variant, the dummy terminals are not provided on a one-to-one permanent basis, i.e. user Bob is not permanently allocated dummy terminal 234, and there are only a relatively small number of dummy terminals, and the CTI server 18 maintains a list of these dummy terminals and allocates them dynamically, as and when users request calls to be made. In this case, the CTI server 18 has to provide the user's CLI, e.g. nnnnn 800800, to the PBX 12, together with the internal port number of the selected dummy terminal.

Figure 9:
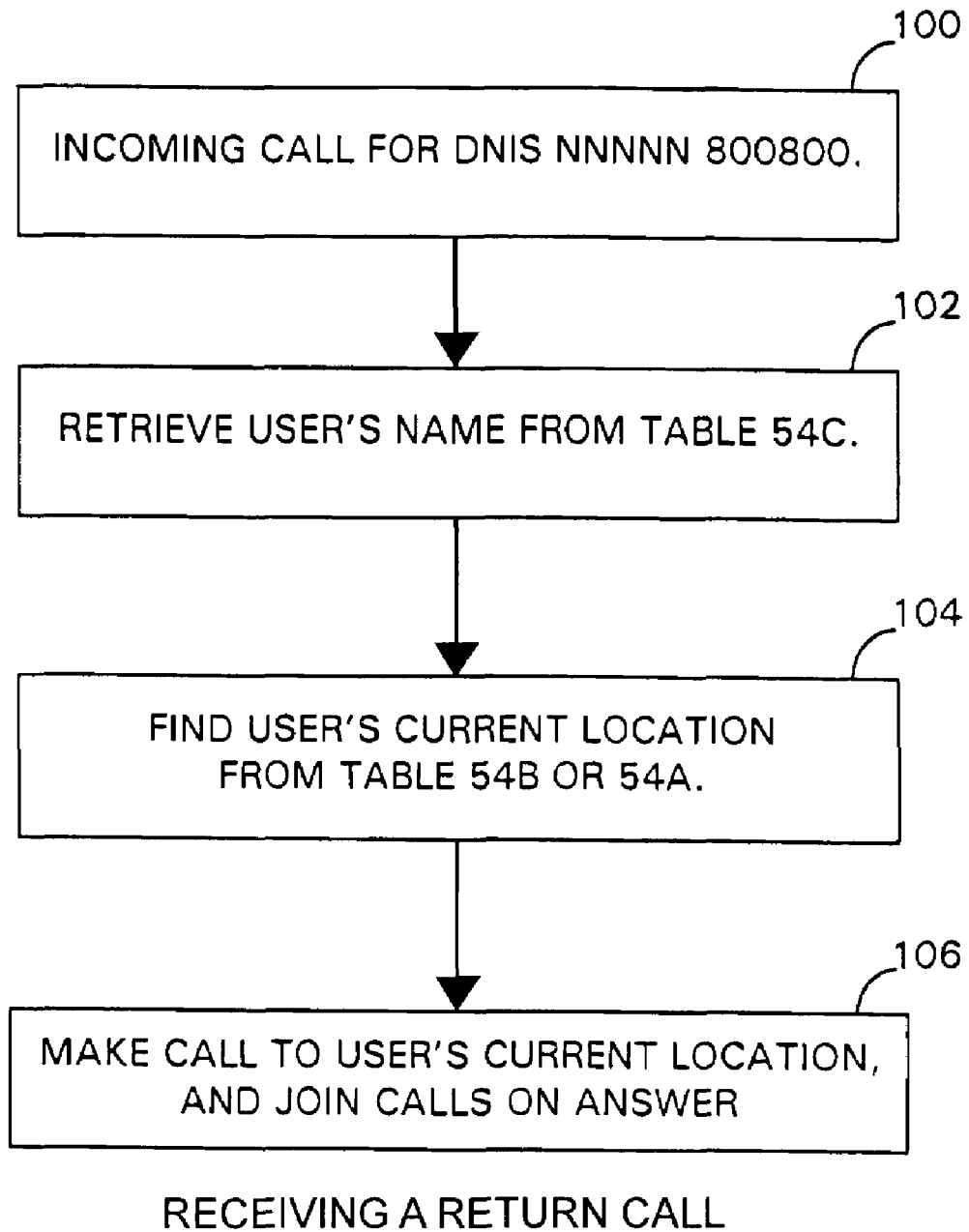
FIG. 9 is a flow chart showing steps of receiving a return call.

If in the first scenario the called party needed to telephone the user Bob, he would now be able to do so by virtue of the delivery of the CLI to the called number. For example, the called party may have a display telephone which displays the CLI of incoming calls, or the called party may be using BT's "1471" service, and knowledge of that CLI, nnnnn 800800, will enable the called user to make a call to that number. Upon receipt of an incoming call at the PBX 12 having a DNIS nnnnn 800800 (step 100, FIG. 9), the PBX 12 will retrieve this DNIS from the signalling information and pass it to the CTI server 18 in a Route Request message. The CTI server 18 will access the name-to-simulated calling line identity translation table 54C using the retrieved DNIS and obtain the name, Bob (step 102, FIG. 9). Then using this obtained name, Bob, the CTI server 18 will find Bob's current location Bob (step 104, FIG. 9). The CTI server 18 accesses the client identity-to-name translation table 548 to see if there is an entry for Bob, and if there is, i.e. Bob is currently logged on at a work desk 26, the CTI server 18 will alert the user Bob at his client 30, using the Incoming Call module 60 in usual manner. If Bob is not currently logged on at a work desk 26, the CTI server will access the calling line identity-to-name translation table 54A to see if there is an entry for Bob at a remote telephone. If there is such an entry, the PBX 12 will make an outgoing call to that remote telephone, and when it is answered, join that outgoing call to the incoming call made to the DNIS, nnnnn 800800 (step 106, FIG. 9).

In another scenario, suppose that a user, who has the name Steve and who has been allocated the CLI nnnnn 800802, has made a call from his home telephone, 01473 nnnnnn, to a predetermined number of the PBX 12. The PBX 12 reports this telephony activity, including the CLI of the source of that call, i.e. 01473 nnnnnn, retrieved from the signalling information of the incoming call, to the CTI server 18 and returns a special services tone to the user Steve, who responds by keying a log on sequence of digits on his keypad (or by speaking these digits where the CTI system includes an interactive voice response system). The CTI server 18 now knows that the user Steve is currently at 01473 nnnnnn, and enters this information in the translation table 54A. Subsequently, when the user Steve sends a log out sequence to the CTI server 18, the entry for Steve is deleted, or at least the entry, 01473 nnnnnn, against the name Steve is deleted.

When the CTI server 18 has made the entry for the user Steve in the table 54A, it commands the PBX 12 to send another special services tone, and the user Steve responds by keying a code corresponding to the Dial operation performed via a client 30, followed by the network number for a called party, e.g. 0171 123 4567, and then hangs up, i.e. goes on hook at his telephone. The PBX 12 reports the dialed number, 0171 123 4567, to the CTI server 18, and now the CTI server 18 provides to the Outgoing Call module 62 a called number, 0171 123 4567, and a CLI, 01473 nnnnnn, and commands the PBX 12 to generate a setup signalling message containing 01473 nnnnnn in its CLI field, and 0171 123 4567 in its DNIS field, and to make a first outgoing call by sending this signalling message to the ISDN 14 via the ISDN primary rate link 16, and a second outgoing call to 01473 nnnnnn, and to join these two calls.

Whereas the specific embodiments described above are based on a switch in the form of a PBX, it will be appreciated that the present invention embraces other forms of switching function. For example, the switch can be a public network switch, such as a Nortel DMS100 switch which is used in known CTI arrangements in conjunction with a CompuCall CTI controller; and other forms of switching function include switches known as Automatic Call Distributor (ACD), Interactive Voice Response (IVR), and server PBX. Furthermore, the type of switching is not limited to any one form, and, in addition to switched circuit technology, includes Asynchronous Transfer Mode (ATM) switching, and Voice over Internet Protocol (VoIP) switching. With regard to this last form of switching, the switch can be a PBX having an Internet Card, or it can be a general purpose computer, e.g. one running Windows NT, having an Internet card, e.g. a Dialogic Internet card, and in this latter case the CTI controller function is provided by a program running in the computer, rather than in a separate controller. Furthermore, the telephones at the workstations can connect to their respective clients via Internet phone jacks, and in an alternative arrangement telephony can be provided for the user via a sound card in his client.

Thus, it can be seen that in general the present invention can be implemented in any computer controlled switch, by means of a suitable controlling program.

In the above specific embodiments, the called user is an individual person who normally works at a workstation. It will be appreciated that a DNIS need not correspond to an individual person, but may relate to a department or group, or a specific function within a company. Furthermore, more than one DNIS can correspond to such a function. As an example, a person can be allocated to a telephone sales function, and all calls made by him would have a common CLI for the sales department. In this way, a called party can return his calls directly to the sales department DNIS, and the CTI system can operate an automatic call distribution function on incoming calls to that department.

It will also be appreciated that the term CTI, although originating from the computer control of voice telephony, is not limited to voice communications and includes other types of communications, e.g. videotelephony, and multimedia.

Furthermore, whereas the abovedescribed specific embodiments are third party CTI arrangements, the skilled person will appreciate that the present invention is also applicable to first party CTI arrangements.

What is claimed is:

1. A method of operating a switching system to make and receive telephone calls, the method comprising:
   (a) responding to a request for the making of a call by:
      (i) obtaining an actual calling party identity assigned to an individual person;
      (ii) translating the obtained actual calling party identity to obtain a corresponding simulated consistent calling line identity permanently and individually associated with the calling party as an individual person; and
      (iii) sending a setup signalling message for establishing a call to the called party, the setup signalling message having a calling line identity field containing the obtained corresponding simulated consistent calling line identity, the simulated consistent calling line identity also enabling calls to be delivered to the individual party associated with the simulated CLI by use of translation tables which hold information as to the identity of that individual party and his/her current recorded location; and
   (b) responding to an incoming call by:
      (i) using an incoming DNIS to identify a simulated consistent CLI associated with an actual CLI permanently associated with an individual party; and
      (ii) connecting the incoming call to the current location of the individual party so identified.

2. A method as in claim 1, wherein the step of responding to a request for the making of a call by obtaining an actual calling party identity comprises the substeps of:
   detecting the actual calling line identity of a line which has changed to off hook status, and translating the detected calling line identity to obtain a corresponding actual calling party identity currently recorded as being associated with that line.

3. A method as in claim 1, for use when the switching system comprises a CTI-enabled switch together with a CTI controller, and a plurality of user-associated computers connected to the CTI controller, wherein the step of responding to a request for the making of a call by obtaining an actual calling party identity comprises the substeps of:
   detecting the identity of a computer from which a make call request has been sent to the CTI controller and translating the detected computer identity to obtain a corresponding actual calling party identity for a user currently recorded as being logged on at that computer to the CTI controller.

4. A method as in claim 1, wherein the step of responding to a request for the making of a call by obtaining an actual calling party identity comprises the substeps of:
   retrieving from signalling information of an incoming call to the switching system a calling line identity, and translating the retrieved calling line identity to obtain a corresponding actual calling party identity.

5. A method as in claim 4, further including joining the incoming call to the call to the called party.

6. A method as in claim 4, and including:
   clearing down that incoming call,
   making a call to the calling party based on the calling line identity of that incoming call, and
   joining the call to the calling party to the called party.

7. A switching system comprising:
   means for responding to a request for the making of a call by obtaining an actual calling party identity assigned to an individual person;
   means for translating the obtained actual calling party identity to obtain a corresponding simulated consistent calling line identity permanently and individually associated with the calling party as an individual person;
   means for obtaining a called individual party identity;
   means for generating a setup signalling message to be sent for establishing a call to the called party, the setup signalling message having a calling line identity field containing the obtained corresponding simulated consistent calling line identity, the simulated consistent calling line identity also enabling calls to be delivered to the individual party associated with the simulated CLI by use of translation tables which hold information as to the identity of that individual party and his/her current recorded location;
   means for responding to an incoming call by using an incoming DNIS to identify a simulated CLI and a corresponding actual individual party identity; and
   means for connecting an incoming call to the current location of the actual individual party corresponding to the simulated CLI identified by the DNIS.

8. A system as in claim 7, wherein the means for responding to a request for the making of a call by obtaining an actual calling party identity is arranged to detect the actual calling line identity of a line which has changed to off hook status, and to translate the detected calling line identity to obtain a corresponding actual calling party identity currently recorded as being associated with that line.

9. A system as in claim 7, comprising a CTI-enabled switch together with a CTI controller, and a plurality of user-associated computers connected to the CTI controller, and wherein the means for responding to a request for the making of a call by obtaining an actual calling party identity is arranged to detect the identity of a computer from which a make call request has been sent to the CTI controller, and to translate the detected computer identity to obtain a corresponding actual calling party identity for a user currently recorded as being logged on at that computer to the CTI controller.

10. A system as in claim 7, wherein the means for responding to a request for the making of a call by obtaining an actual calling party identity is arranged to retrieve from signalling information of an incoming call to the switching system a calling line identity, and to translate the retrieved calling line identity to obtain a corresponding actual calling party identity.

11. A method for operating a computer/telephone switching system to make and receive calls for an organization that may include individual persons variably positioned at different ones of plural workstations, said method comprising:

maintaining data identifying each of plural individuals and the respective workstation at which each said individual is currently located;

maintaining data identifying each of said individuals and a respectively associated simulated consistent CLI;

setting up outgoing telephone calls from an individual of said organization using a respectively corresponding one of said simulated consistent CLI data;

using DNIS data from incoming telephone calls in conjunction with said simulated consistent CLI data and said maintained data identifying individuals to direct incoming telephone calls to a respectively corresponding individual person at a workstation where that person is currently located.

12. The method of claim 11 wherein said maintained data is organized in plural tables of data.

13. The method of claim 11 wherein at least one of said current workstation locations is remotely positioned with respect to other workstations, said method also comprising:

maintaining data identifying a remote telephone CLI associated with an identified individual's current location, said remote telephone CLI having been captured when said identified individual earlier placed an incoming call from said remote location.

* * * * *